(12) United States Patent
Redert et al.

(10) Patent No.: US 7,692,859 B2
(45) Date of Patent: Apr. 6, 2010

(54) OPTICAL SYSTEM FOR 3-DIMENSIONAL DISPLAY

(75) Inventors: Peter-Andre Redert, Eindhoven (NL); Marcellinus Petrus Carolus Michael Krijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 32 days.

(21) Appl. No.: 12/092,416

(22) PCT Filed: Oct. 26, 2006

(86) PCT No.: PCT/IB2006/053947

§ 371 (c)(1),
(2), (4) Date: May 2, 2008

(87) PCT Pub. No.: WO2007/069099

PCT Pub. Date: Jun. 21, 2007

(65) Prior Publication Data

US 2008/0278809 A1    Nov. 13, 2008

(30) Foreign Application Priority Data

Nov. 2, 2005    (EP)    ................... 05110261

(51) Int. Cl.
*G02B 27/22* (2006.01)
*G02B 27/10* (2006.01)
(52) U.S. Cl. ...................... 359/478; 359/622
(58) Field of Classification Search ............ 348/51, 348/54, 59; 359/462, 463, 464, 478, 619, 359/621, 622, 626
See application file for complete search history.

(56) References Cited

U.S. PATENT DOCUMENTS 6,069,650 A    5/2000    Battersby (Continued)

FOREIGN PATENT DOCUMENTS

WO    WO9722033 A1    6/1997

(Continued)

OTHER PUBLICATIONS

Van Berkel, C.: "Image Preparation for 3D-LCD"; Part of the IS&T SPIE Conference on Steroscopic Displays and Applications, San Jose, CA, Jan. 1999, SPIE vol. 3659, pp. 84-91, 1999.

*Primary Examiner*—David N Spector
(74) *Attorney, Agent, or Firm*—Larry Liberchuk

(57) ABSTRACT

An optical system that can add an optical depth information to a two-dimensional image (72) represented by substantially collimated light, e.g. by using a collimated light source in front of a LCD display. The optical system includes a first array of optical lenses (70) arranged at a first distance in front of the two-dimensional image (72), and a second array of optical lenses (71) arranged at a second distance in front of the two-dimensional image (72), the second distance being larger than the first distance. Optical properties, e.g. focal length, can be adjusted for the optical lenses of the first and second array of optical lenses (70, 71) in response to the optical depth information. The optical system can serve as an optical front for 3D multiview displays. Depending on embodiment, both horizontal and vertical angular resolution can be obtained, and the front end exhibits only a small brightness loss.

12 Claims, 7 Drawing Sheets

U.S. PATENT DOCUMENTS

Figure 1:
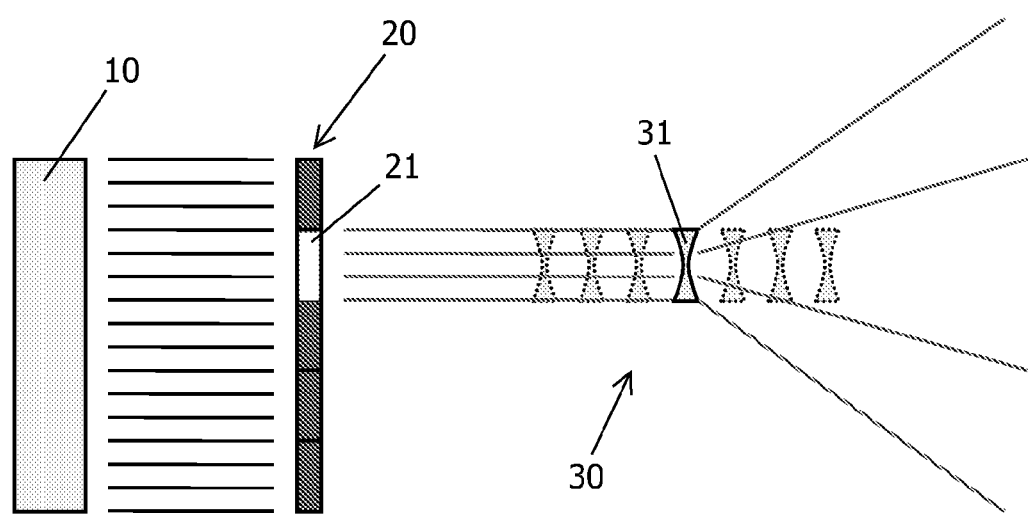

2004/0227992 A1 11/2004 Putilin et al.
2008/0278808 A1* 11/2008 Redert .................. 359/478

FOREIGN PATENT DOCUMENTS

| WO | WO0120386 | A2 | 3/2001 |
| WO | WO0144858 | A2 | 6/2001 |
| WO | WO03071335 | A2 | 8/2003 |
| WO | WO03081920 | A2 | 10/2003 |
| WO | WO2004070467 | A2 | 8/2004 |
| WO | WO2004075526 | A2 | 9/2004 |
| WO | WO2005006774 | A1 | 1/2005 |
| WO | WO2005036235 | A1 | 4/2005 |

* cited by examiner

OPTICAL SYSTEM FOR 3-DIMENSIONAL DISPLAY

The invention relates to the field of three-dimensional (3D) display of images and/or video signals. Especially, the invention provides an optical system suited for use with a two-dimensional (2D) display. In addition, the invention provides a 3D display device and a method for providing a 3D effect based on a 2D image.

BACKGROUND OF THE INVENTION

In broadcast television systems, 3D television (3DTV) might be the next revolution after the introduction of color TVs. In professional applications (medical/industrial), 3D visualization is already commonplace. In entertainment and mobile communication, 3D visualization is of upcoming commercial interest.

One type of 3D display is the auto-stereoscopic multi-view display, such as the 3D-LCD described in [C. van Berkel, "Image preparation for 3D-LCD", *Proc SPIE*, Vol. 3639, pp. 84-91, 1999]. This display provides free 3D viewing for multiple viewers, without the need for special 3D-glasses. It is composed of a standard 2D matrix display followed by some optical front end.

A serious problem of these displays is the resolution. The optical front end distributes the original spatial resolution of the 2D matrix display over spatial and angular resolution. The latter is called the 'number of views' $N_{views}$. Current displays have $N_{views} \sim 10$, leading to a loss of spatial resolution of a factor ~10.

Current developments partially solve the resolution loss via switchable displays. The optical front-end can be switched on or off, leading to 3D imaging with reduced resolution, or 2D imaging with full 2D resolution. Current switching principles based on lenses result in additional performance loss, due to lower refractive power of adjustable lenses compared to fixed lenses.

Multi-view displays require $N_{views} \sim 100$ to meet high-quality depth and viewing angle requirements. This leads to severe resolution loss.

Finally, current displays only provide horizontal angular resolution. This is sufficient in normal viewing conditions. In several cases however, viewing is impaired. Vertical movements of the viewer lead to elasticity in the 3D image. The 3D effect is lost if the display is rotated 90°, e.g. for document writing, or if the viewer rotates his head (e.g. watching TV from the coach). Adding vertical angular resolution leads to an additional factor resolution loss (in total e.g. $N_{views;x} * N_{views;y}$).

WO 2004/075526 A2 describes an autostereoscopic display device comprising a 2D display array for providing a 2D image based on collimated light, and a splitting screen disposed in front thereof. The splitting screen scans the image, and sequentially displays image in a range of exit angles. By timing the displayed image on the display array with the scan using means for addressing the pixels of the display array, a multiview autostereoscopic displaying of images is achievable. The splitting screen may be a lenticular lens screen having a plurality of cylindrical lenses arranged such in respect to pixels of the display array that the collimated light of a pixel enters a lens off-axis and the focal point of the lens is controllable. The temporal multiplexing requires a display with very high frame-rate, and currently available frame-rates limit the number of independent views.

WO 03/081920 A2 describes 3D display device based on a 2D display for generating a 2D image, and an optical front end positioned in front thereof. The optical front end includes a corrector plate, a first Fresnel type lens positioned in front thereof, and a second Fresnel type lens positioned in front of the first Fresnel type lens. However, such a display will only provide a focused image at an image plane located at a certain distance from the Fresnel optics.

It may be seen as an object of the present invention to provide an optical system that can serve to provide a depth dimension to a 2D image and can be seen from a variety of viewing angles without suffering from neither resolution loss nor brightness loss.

In a first aspect the invention provides an optical system adapted to add an optical depth information to a two-dimensional image represented by substantially collimated light, the optical system comprising:
    a first array of optical lenses arranged at a first distance in front of the two-dimensional image, and
    a second array of optical lenses arranged at a second distance in front of the two-dimensional image, the second distance being larger than the first distance, wherein optical properties of the optical lenses of the first and second array of optical lenses are adjustable in response to the optical depth information.

The two-dimensional image represented by collimated light includes a plurality of pixels, such as provided by a 2D display matrix.

The optical system according to the first aspect can serve as an optical front-end to be arranged in front of a 2D image and provide an optical depth to the 2D image. The optical system is applicable to 2D displays that are capable of producing a 2D image represented by substantially collimated light. Such displays may for example be based on a collimated light source positioned behind a 2D pixel matrix based on Liquid Crystal Display (LCD) or Liquid Crystal on Silicon (LCOS) techniques.

The optical system enables multi-view 3D displays that do not sacrifice any resolution or brightness of the underlying 2D display, regardless of $N_{views}$. Depending on the actual embodiment, the obtained visual 3D effect can be similar to what can be obtained with volumetric displays or multi-view displays. In some embodiments both horizontal and vertical angular resolution can be obtained, or in some embodiments only horizontal angular resolution is obtained.

With the optical system according to the first aspect rendering is not needed to provide 3D images, i.e. there is no need for powerful signal processors or the like to provide a 3D image based on a video signal with a depth information, e.g. the RGBD video signal (Philips Research 3D video standard). The depth part D of such RGBD signal is used to control the focal length of the optical lenses pixel-wise, e.g. based on a simple conversion formula, and the 2D image part RGB of the RGBD signal is applied to a 2D display behind the optical system in a conventional manner.

By adjustable optical properties of the optical lenses is to be understood any adjustable optical property or parameter of the optical lenses that influences the focal length or strength of the optical lenses. Such arrays exist that are capable of adjusting optical e.g. focal length by means of applying an electrical current individually to each optical lens, such as GRIN lenses or the so-called fluid-focus lenses.

In preferred embodiments the optical system, i.e. the two arrays of optical lenses, are each substantially flat, i.e. each of the arrays have optical lenses arranged so that they extend in one plane. This is especially preferred in combination with a flat 2D display. However, if the 2D display has a curved surface, then the optical system is preferably shaped with an according curve so as to provide for the entire area of the 2D display, the same distance from the 2D display to the first array of optical lenses of the optical system.

In some embodiments the optical lenses of the first and second arrays of optical lenses can be switched between a first state and a second state, wherein the optical lenses are refractive in the first state and non-refractive in the second state. With such simple optical adjustment properties, it is possible to provide an embodiment capable of providing a depth by choosing either a lens of the first or the second array to be refractive while a lens in the other array at the same position is chosen to be non-refractive, where position is related to the 2D spatial coordinates of the 2D image. In this way an apparent position of the 2D image will be at the position of the refractive lens. Preferably, such an embodiment includes several arrays of optical lenses similar to the first and second layers so as to enable an acceptable depth resolution.

In other embodiments a focal length, or optical strength, of the optical lenses of the first and second arrays of optical lenses can be adjusted so as to emulate a virtual lens positioned between the first and second arrays of optical lenses. In preferred embodiments the lenses are continuously adjustable. In embodiments where a virtual lens can be emulated it is possible to provide a considerable depth resolution using only two arrays of lenses, the lenses being positioned with a distance given by a target maximum image depth.

The optical properties of the optical lenses are preferably individually adjustable for each lens. Thus, it is possible to adjust the lenses so that different areas of the 2D image, e.g. down to pixel size, have different associated depth. Thus, a depth image can be applied onto the 2D image without the need for temporal multiplexing which will require a fast display matrix.

The shape of the adjustable optical lenses of the first and second arrays of lenses is preferably selected from the group consisting of: horse-saddle shape, Fresnel-type shape, spherical shape, and lenticular shape. It is possible to use the same shape of lenses for both the first and second arrays or lenses, or alternatively the first and second arrays of lenses may have different lens shapes.

The optical system may comprise a processor adapted to perform a morphological filtering on the optical depth information prior to serving to adjust the optical lenses of the first and second arrays of optical lenses. Such morphological filtering can be applied to solve problems with light rays being refracted multiple times in between two arrays of lenses at different depths in case many such arrays are used. In case only two layers are used, multiple refractions hardly occur. When continuously adjustable lenses are used, the morphological filtering can still be applied advantageously, to solve spatial misalignments. These occur since rays passing through a single lens in the first array may pass through several different lenses in the second array, at slightly different spatial locations in terms of 2D image coordinates.

In case the 2D image is pixellized, a size of the optical lenses of the first and second arrays of optical lenses is preferably substantially equal to or smaller than a pixel size of the two-dimensional image. This enables first and second arrays of pixel-wise optical lenses. If optical properties of these lenses are individually adjustable, it is possible to provide a depth image with a high spatial resolution as well as a high depth resolution.

The optical system preferably comprises a diffuser positioned at a third distance in front of the two-dimensional image, the third distance being larger than the second distance. Preferably, the diffuser is a vertical diffuser that refracts incoming light rays in all arbitrary vertical directions but not horizontally. Such diffuser will enable viewers to observe the display from different vertical viewing angles.

In a second aspect the invention provides a method for applying an optical depth information to a two-dimensional image of pixels, the method comprising the steps of
    applying a first array of optical lenses arranged at a first distance in front of the two-dimensional image, and
    applying a second array of optical lenses arranged at a second distance in front of the two-dimensional image, the second distance being larger than the first distance,
    adjusting optical properties of the optical lenses of the first and second array of optical lenses in response to the optical depth information.

In principle the same advantages, embodiments and applications as described above for the first aspect apply for the second aspect as well.

In a third aspect the invention provides a three-dimensional display device adapted to receive a video signal including a depth information, the three-dimensional display device comprising:
    a display arranged to display a two-dimensional image of substantially collimated light representing the video signal, and
    an optical system comprising:
        a first array of optical lenses arranged at a first distance in front of the two-dimensional image, and
        a second array of optical lenses arranged at a second distance in front of the two-dimensional image, the second distance being larger than the first distance,
        wherein optical properties of the optical lenses of the first and second array of optical lenses are adjustable in response to the optical depth information.

The display device may receive an RGBD signal and apply the RGB part hereof to the display arranged to display the 2D image, while a depth part D of such signal is applied to the optical system where this depth part D is used to adjust the optical properties of the first and second arrays of lenses so a to provide a depth dimension to the 2D image. As indicated for the first aspects, LCD or LCOS display techniques may be used to provide a 2D display matrix, where a collimated light source is used to provide collimated light behind the 2D display matrix.

In principle the same advantages, embodiments and applications as described above for the first aspect apply for the third aspect as well.

It is appreciated that the invention is applicable for any type of product including 3D imaging facilities. For example TV sets such as 3DTV, computer displays, handheld computers, mobile phones, mobile games and the like, large displays for showing commercials or for showing public event, e.g. sport events or concerts. Within medical applications the invention can be applied to 3D displays for 3D imaging of scanning results or for a 3D display for assisting a surgeon in navigating in a complicated surgical treatment, or in a virtual reality operation for training purposes.

Figure 2:
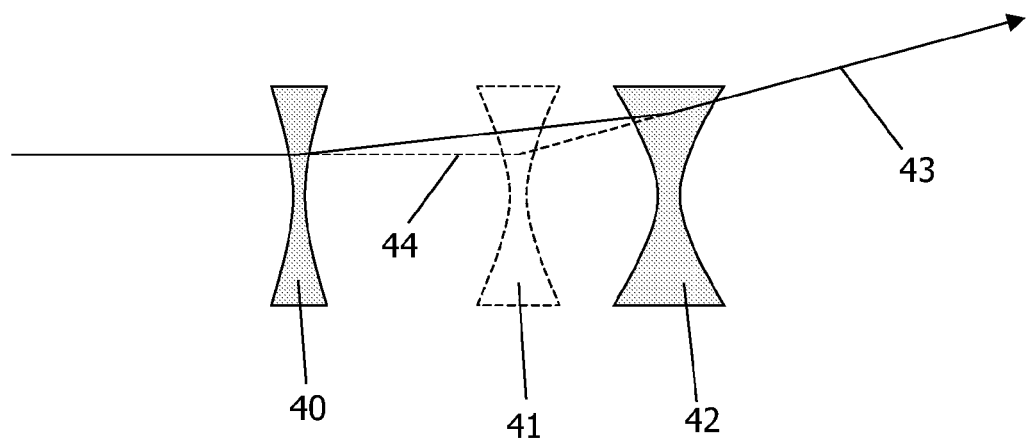
Figure 3:
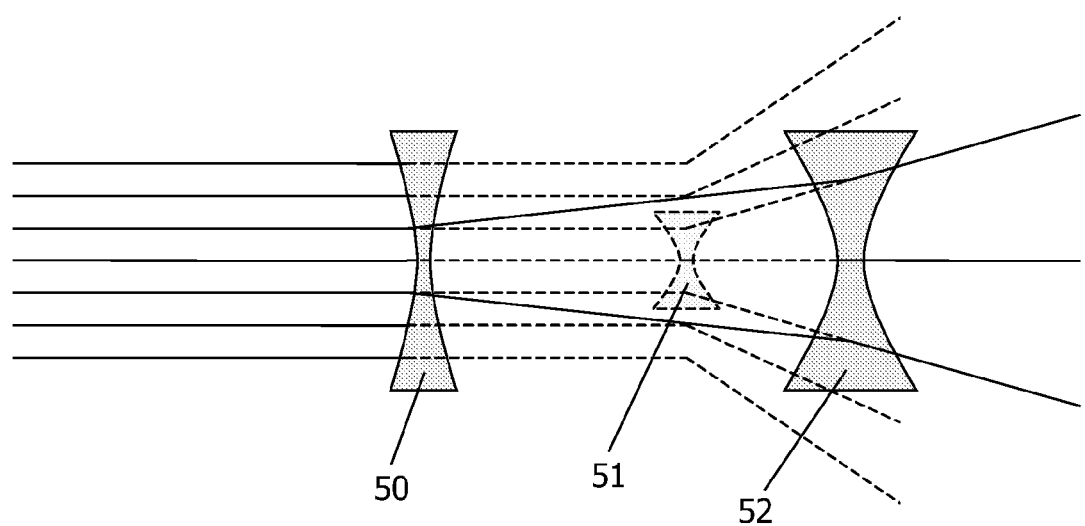
Figure 4:
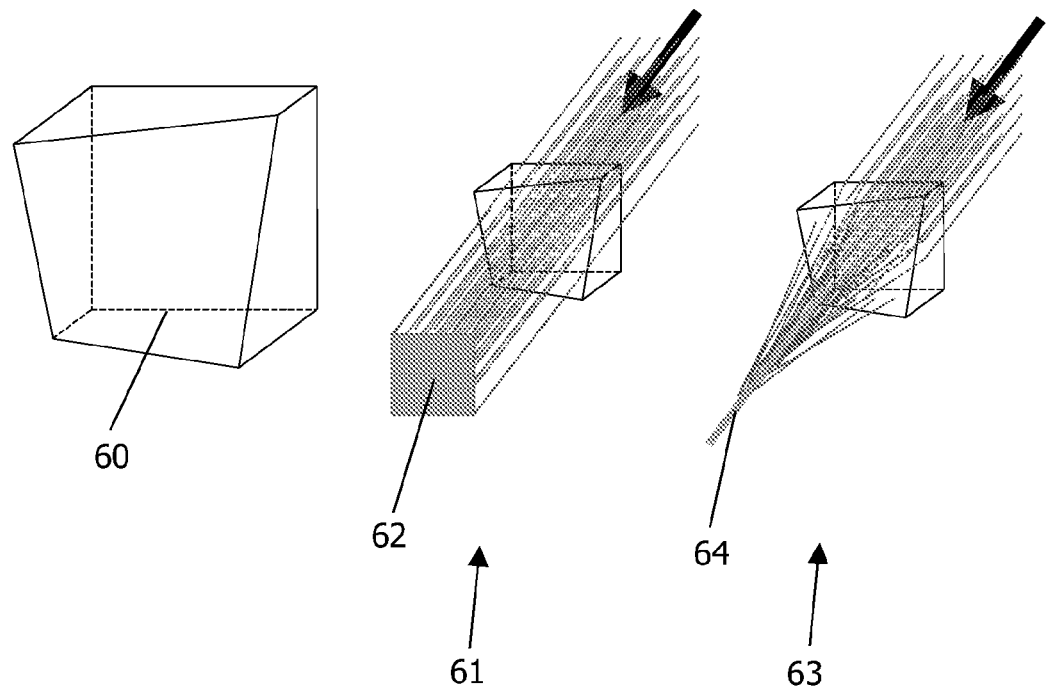
Figure 5:
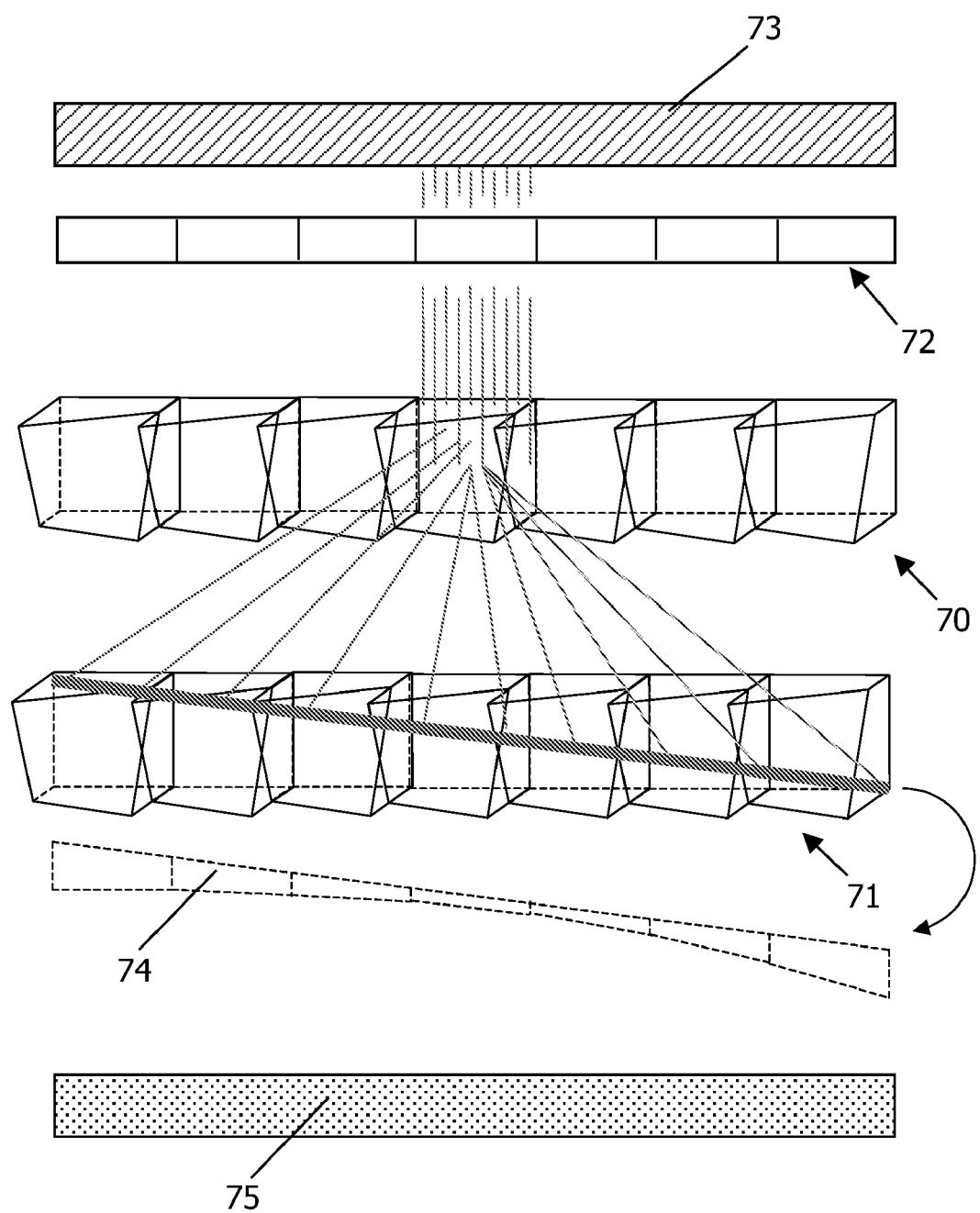
Figure 6:
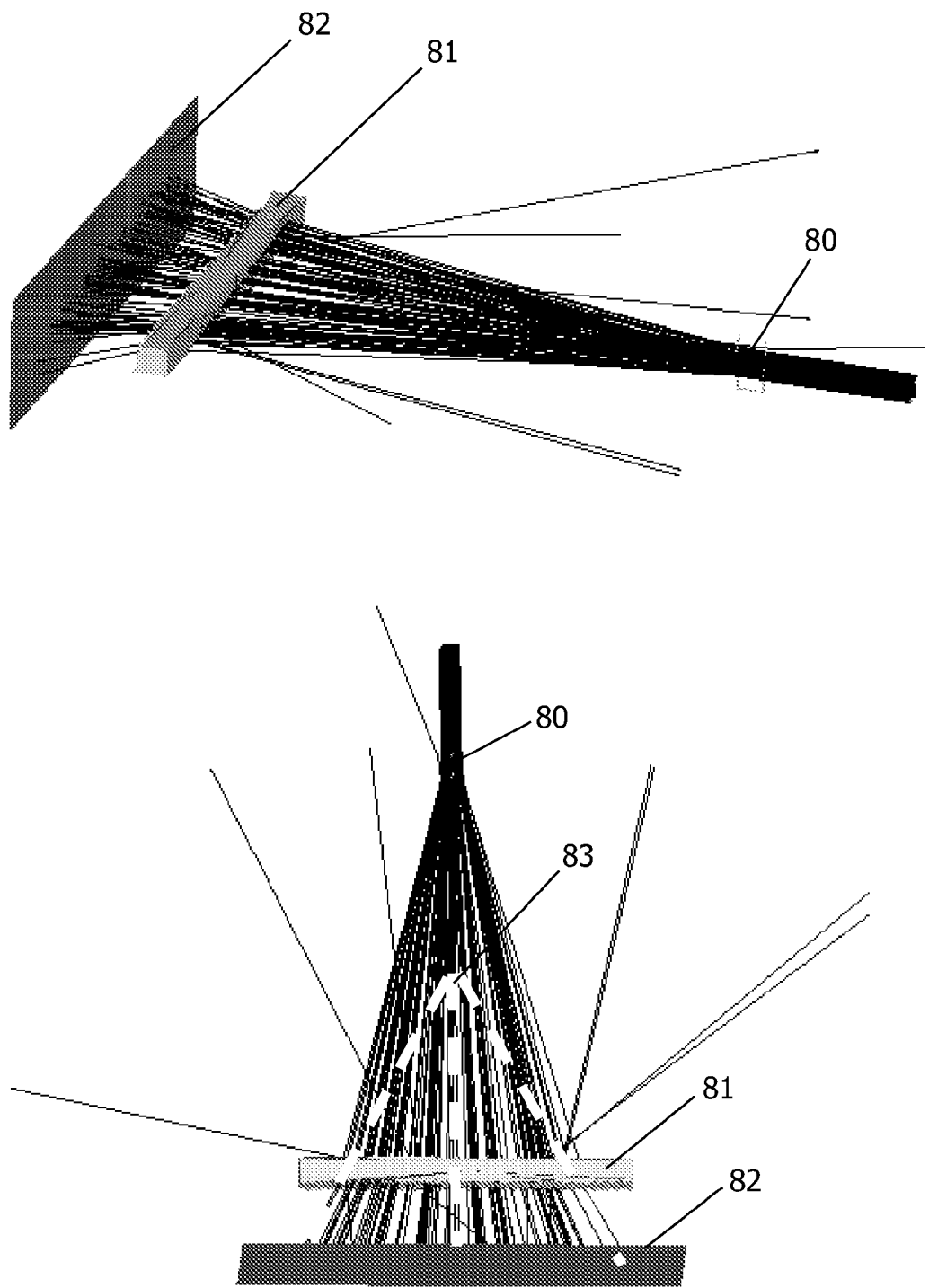
Figure 7:
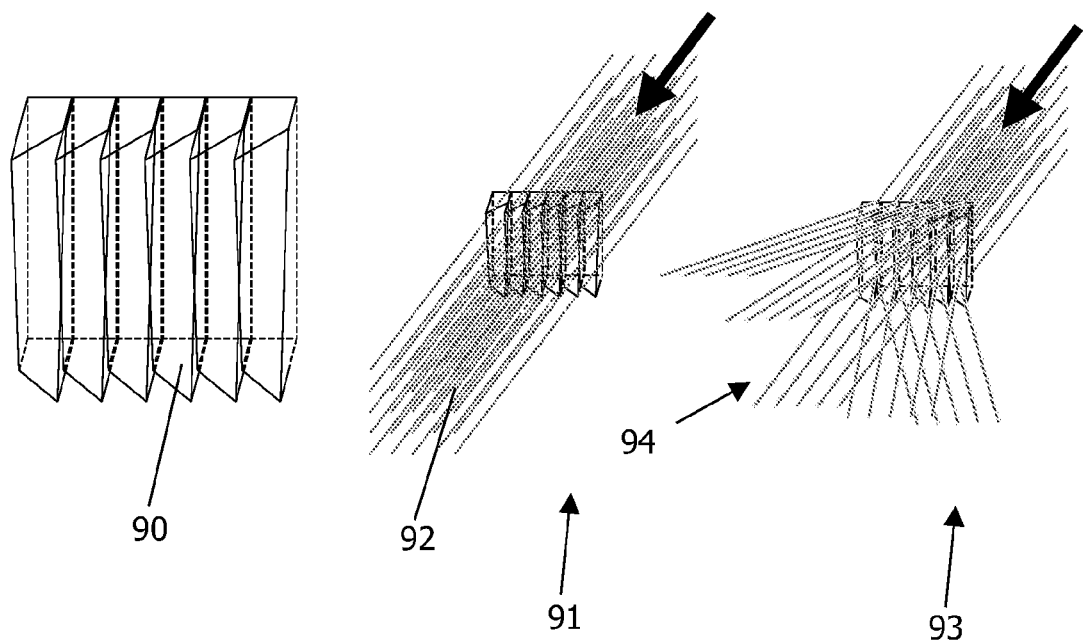
Figure 8:
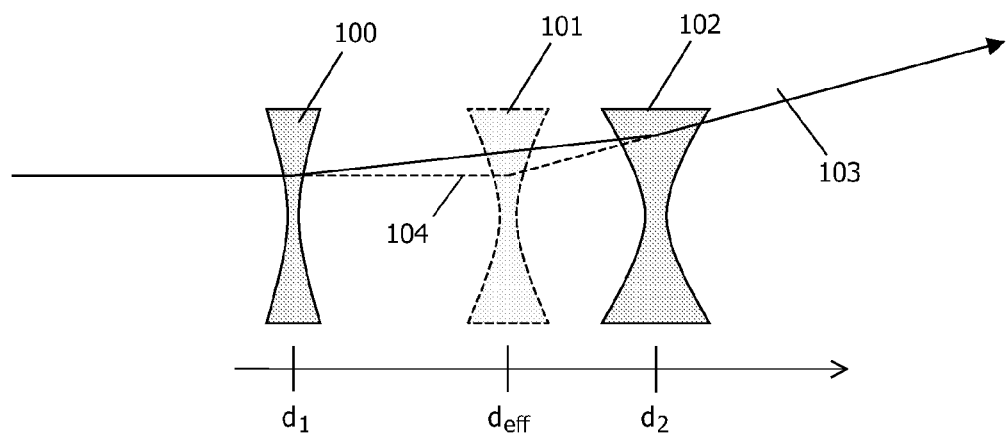
Figure 9:
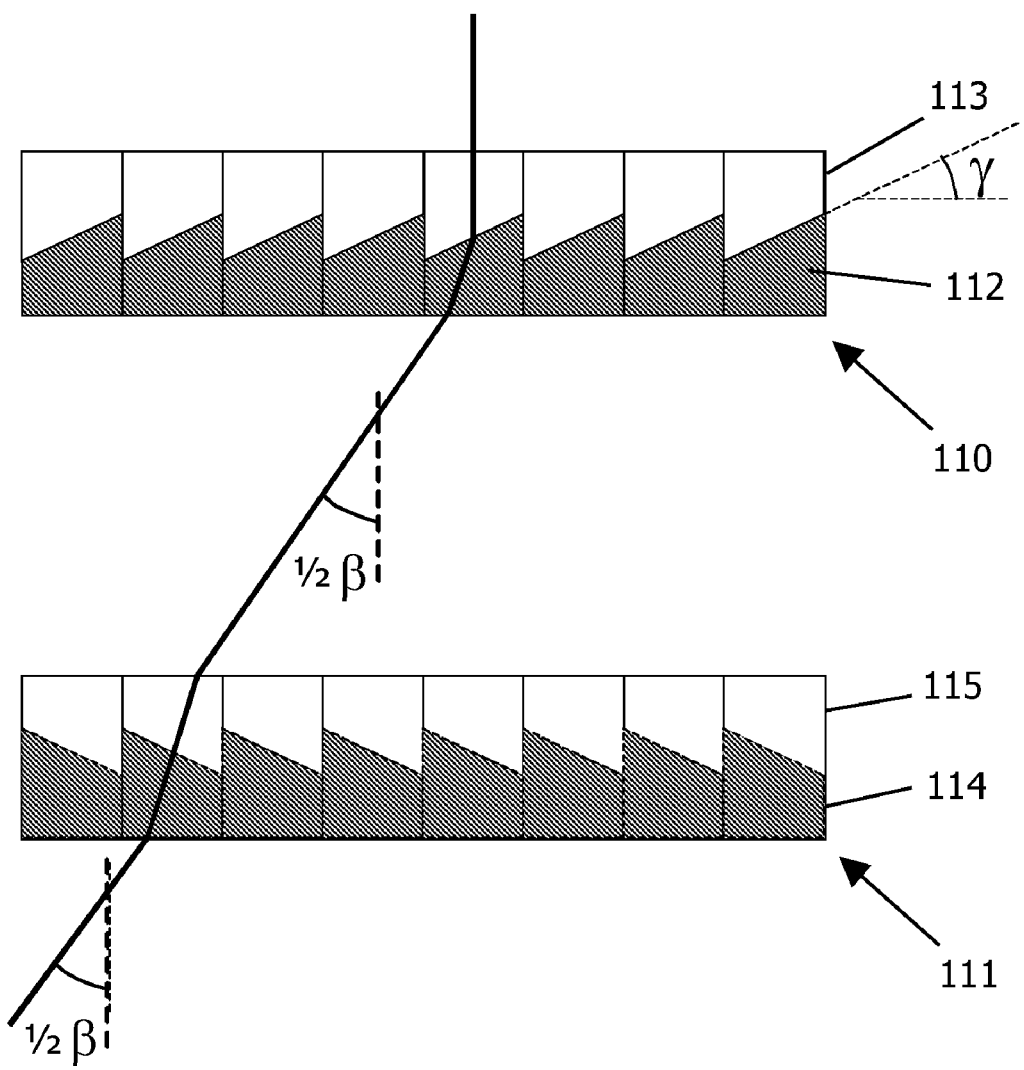
Figure 10:
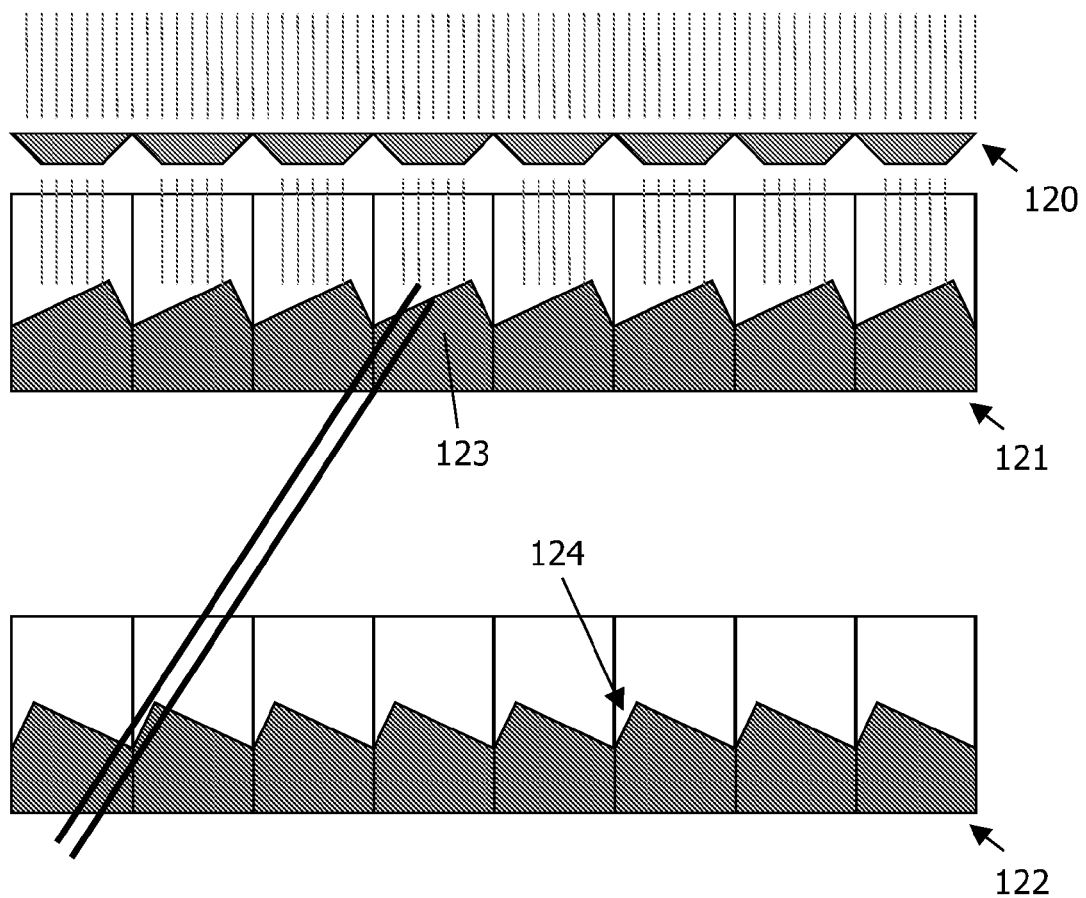

In the following the invention is described in more details with reference to the accompanying Figures, of which FIG. 1 illustrates principles of an embodiment with a stack of several on/off switchable diffusers, FIG. 2 illustrates principles of an embodiment with two continuously adjustable lenses capable of providing a virtual lens apparently positioned between the two adjustable lenses, FIG. 3 illustrates a problem with the configuration of FIG. 2 regarding a limited aperture of the virtual lens, FIG. 4 illustrates a preferred adjustable lens with a horse-saddle shape and its effect on collimated light in an "off" state and in a fully turned "on" state, FIG. 5 illustrates an example of light rays through a preferred embodiment including two arrays of lenses, a first layer being turned "on" while a second layer being turned "off", FIG. 6 illustrates simulated light rays through a preferred embodiment wherein lenses of first and second lens arrays are both turned 50% "on", FIG. 7 illustrates an adjustable Fresnel type lens and its effect on collimated light in an "off" and in a fully turned "on" state as an alternative to the lens shown in FIG. 4, FIG. 8 defines focal lengths and distances in a depth direction for two lenses and a virtual lens apparently positioned between the two lenses, FIG. 9 illustrates various parameter for two arrays of adjustable Fresnel type lenses, where a lenses of the first array are turned fully "on" while lenses of the second array are turned fully "off", and FIG. 10 illustrates adaptation of back light and lens shape to prevent internal reflections in case Fresnel type lenses are used.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

FIG. 1 serves to illustrate, in an top view, the principle behind one embodiment of the present invention where a depth dimension of a 2D image is generated by means of an optical front end with a stack of optical lenses 30 positioned in front of a 2D image of collimated light. The 2D image is provided by a collimated light source 10 that illuminates a 2D display matrix 20 of pixels, e.g. a LCD or LCOS, with parallel light rays. The 2D display matrix 20 imprints a 2D image, e.g. a normal RGB image, on these rays.

In front of each pixel 21 of the 2D display matrix 20, a stack of optical lenses 30 are positioned at different distances in the depth direction, i.e. perpendicular to a plane formed by the display matrix 20. The optical lenses 30 serve as adjustable diffusers that can be adjusted between a non-refractive ("off") state and a refractive ("on") state. By switching one of the optical lenses 31 "on" while the remaining optical lenses of the stack of optical lenses 30 are "off", the "on" lens 31 refract, i.e. act as a diffuser for, the parallel light rays of collimated light through the pixel 21. For a viewer in front of the display, the refracting optical lens 31 will act as apparent position of the pixel 21, and thus a depth dimension has been applied to the 2D image provided by the display matrix 20. A depth information, e.g. as included in an RGBD signal, can be used to select for each pixels of the 2D image, an appropriate lens of the stack of lenses 30 to be switched to its refracting state while the remaining lenses of the stack of lenses 30 are switched to non-refracting.

Even though FIG. 1 only illustrates, for simplicity, optical lenses 30 aligned with one pixel 21, it is to be understood that a similar set of optical lenses is located in front of preferably every pixel in the 2D image. Thus, it is possible to apply a depth dimension to each pixels of the 2D image provided by the 2D display matrix 20, and a full 3D image will be present for any viewer in front of the display, with both horizontal and vertical parallax, and without resolution or brightness loss. The viewing angle of the display will be regulated by the strength of the optical lenses (or diffusers) 30. In FIG. 1 a stack of seven optical lenses 30 is shown for illustration, but the chosen number of lenses depends on a desired depth resolution—more lenses in the stack of lenses means higher depth resolution. A distance between the lens closest to the 2D image and the lens in the stack being at the largest distance to the 2D image will determine the range of depths that can be applied to the 2D image.

In case more than two lens layers are used, to prevent light rays being refracted multiple times in between two or more optical lenses at different depths, the depth pattern should change smoothly across the 2D image. Effectively, no optical lens should be in "on" state if it is positioned in a light cone of another optical lens in "on" state, i.e. no object should occlude another. This requirement may be easily met by processing a depth information using morphological filters with very low complexity.

Optical lenses of diffusers 30 as those described in FIG. 1 can be made in a variety of ways. The simplest one shown in FIG. 1 (positive or, as shown, negative) lenses exist as switchable matrix lenses, for window-based-switchable 2D-3D displays. Furthermore, Fresnel lenses can be used, which may be easier to manufacture in flat pixel-matrices. As the Fresnel lenses are used only as a diffuser, their quality/strength trade-off can be set completely to strength, enabling wide viewing angles.

Alternatively, instead of lenses, other types of diffusers can be used e.g. on the basis of LC polymer gel as used within for active backlight scanning window techniques. These can be made in active matrices.

FIG. 2 illustrates, for a single pixel, a preferred embodiment. While the embodiment shown in FIG. 1 has the disadvantage of requiring a stack of several adjustable optical lenses or diffusers to provide an acceptable depth resolution, the embodiment in FIG. 2 provides a similar functionality but with only two arrays of optical lenses. In FIG. 2 a first optical lens 40 is positioned at a first distance in front of a pixel of a 2D image of collimated light, while a second optical lens 42 is positioned in front of the 2D image at a second, larger, distance. A focal length, or strength, can be continuously adjusted on both the first and second optical lenses 40, 42 independent of each other. The net effect is the same as if one virtual optical lens 41 is present at some other location, depending on the real first and second optical lenses' positions and strength (focal length). This is illustrated in FIG. 2 by an example of a light ray path 43 from the pixel of the 2D image through the first and second optical lenses 40, 42 and a corresponding apparent light ray path 44.

Thus, in FIG. 1 the stack of on/off optical lenses can be replaced by a two pixel-matrix arrays of optical lenses, one array at desired minimum depth and one array at desired maximum depth, with each optical lens having a continuously adjustable focal length or strength. In thus way it is possible to construct a virtual lens at any desired depth position (at least in between the two arrays) by adjusting the strength or focal length of the two optical lenses appropriately.

The above method works well in case the virtual optical lens 41 is to be positioned exactly at the position of the first optical lens 40 or at the position of the second optical lens 42. In case the virtual optical lens 41 is to be positioned at the position of the first optical lens, refracted light rays will pass many different lenses of the second array of lenses, corresponding to other display pixels, but this is not a problem as in this case all lenses of the second array will be in full 'off' state, i.e. non-refractive.

FIG. 3 illustrates a problem for intermediate positions of a virtual lens 51. A first lens 50 and a second lens 52 can create a virtual lens 51 with appropriate positions and focal lengths (strengths), but an effective aperture of such virtual lens 51 will be too small. A fixed and limited aperture of the second optical lens 52 results in a smaller aperture for the virtual lens 51.

This can be compensated by appropriate up-scaling of the aperture of the second lens 52. An adaptive aperture scaling may be performed, however such adaptive aperture scaling may be complicated. Primarily, any aperture bigger than a size of a pixel will disable tiling the lenses in a dense pixel matrix.

A solution to this problem is to use a specific type of optical lenses for both the first and second arrays of optical lenses. This specific type of optical lenses combines adaptive strength with adaptive aperture scaling, while maintaining the ability for dense-pixel-tiling. With this method, we the ability to generate vertical motion parallax is lost. In the following appropriate types of optical lenses are discussed as well as an interaction between the two arrays of optical lenses.

FIG. 4 illustrates, to the left, a 3D sketch of a preferred shape of the optical lens 60 to be used for each pixel of both the first and second arrays of optical lenses: a "horse-saddle" shaped lens 60. Such a lens 60 will bend incoming collimated light into a focus in one direction, while spreading light in a direction orthogonal to it. By adjusting the lens to a full "off" state 61, collimated light rays will pass the lens unaffected and thus collimated light in a pixel size area will still be pixel sized 62, as illustrated in the middle sketch of FIG. 4, while the sketch to the right illustrates that the lens brings collimated light into a line of focus 64 when adjusted into a fully "on" state 63.

A "horse-saddle" shaped lens may be described by h=x*y, with h is the height (or thickness), at a local spatial position x,y, with x=y=0 referring to the center of the lens. Along the line x=y, this yields a positive lens, and along y=−x, a negative lens (or vice versa depending on the refraction indices of the lens material and the substrate in which the lens is embedded). Such a lens has thus two focal lengths at the same time, differing in sign. Depending on the scale of x and y, the actual formula could be somewhat different, e.g. include constants.

FIG. 5 shows, for a line of pixels, a preferred optical system including first and second arrays 70, 71 of "horse-saddle" shaped optical lenses for each pixels 72 of a 2D image. The 2D image is provided by a spatial light modulator with a matrix of pixels 72 (e.g. a conventional LCD matrix) imprinting the 2D image onto light of a collimated light source 73. The optical lenses of the first array 70 are oriented in such a way that when they are adjusted to fully "on", their line of focus is across a number of optical lenses in the second optical array 71. The illuminated parts together form the required large-aperture lens.

In the illustrated example shown on FIG. 5 the optical lenses of the first array 70 are turned almost fully "on", i.e. it is in almost maximal refracting state, and thus almost maximal aperture is required for the second array 71 (in the exceptional case of array 70 being fully "on", array 71 will typically be fully "off" and the shape and size of its lenses is irrelevant). In the example the middle pixel of the matrix of pixels 72 is active, and collimated light rays through this pixel are indicated with straight lines. These rays meet the middle optical lens of the first array 70, and since this array 70 is turned "on", the rays are refracted in this lens as shown. The refracted rays are shown to enter all shown seven lenses of the second array 71. The fat straight line through all shown seven lenses of the second array 71 illustrates the locations where the rays meet with array 71, corresponding to a line of focus of the middle optical lens of array 70. The dashed lines 74 illustrate the cross-section of the lenses in array 71, where the cross-section is in the directions of depth and along the line of focus. This cross-section is the only part of the lenses in array 71 being used by the active pixel and center lens of array 70. As shown, this cross-section has exactly the desired shape and size, having an aperture substantially larger than each individual lens.

A vertical diffuser 75 is shown in FIG. 5 to be positioned at a distance in front of the second array 71. This vertical diffuser 75 enables to view the display from different heights. This is needed since the two optical lens arrays 70, 71 refract light mainly horizontally, and thus their vertical refraction is very limited. Where a full diffuser refracts incoming light rays in all arbitrary directions, (e.g. grinded glass), a vertical diffuser refracts incoming light rays in all arbitrary directions but only vertically. A normal lenticular array such as used for 3D displays can be used for this purpose, when oriented correctly (usually perpendicular to the orientation in conventional lenticular 3D displays).

FIG. 6 shows light rays resulting from a simulation of the optical system illustrated in FIG. 5. FIG. 6 illustrates a result for the most relevant situation when lenses of the first and second arrays 80, 81 are both turned 50% "on", i.e. the first and second arrays 80, 81 are both in a partially refracting state. As in FIG. 5 a vertical diffuser 82 is positioned in front of the second array of lenses 81. For simplicity FIG. 6 shows the situation with only one pixel active, and thus only one lens of the first array 80 is active. An apparent pixel position 83 is indicated, midway between the first array 80 and the second array 81. The simulation shows that some light rays are refracted in a wrong backwards direction. This is because these rays accidentally encountered a lens exactly at its edge. This is not relevant, as the number of such rays is very small.

FIG. 7 shows lens 90, which is a Fresnel version of horse-saddle lens 60 from FIG. 5. Being "Fresnel" in this case means that the original lens 60 is sliced into several sublenses along the horizontal direction, as is clearly shown in FIG. 7, in such a way that the local surface orientation is substantially the same for lens 60 and lens 90. The Fresnel type of lens was used for the second array of lenses 81 in the simulation of FIG. 6. Fresnel lenses may be used either in one of the first and second arrays, e.g. with the "horse-saddle" shaped lens used for the opposite array, or the Fresnel lens may be used in both the first and the second arrays. The thin structure of the Fresnel lens may ease making them adjustable. Also, their vertical refraction is almost zero, depending on the number of sub lenses. This may ease system design but cause a somewhat more undesired refraction—which was also seen as the undesired reflected rays in FIG. 6. The central sketch of FIG. 7 shows collimated ray light traveling through an adjustable Fresnel lens 91 adjusted to be in an "off" state, i.e. in a non-refractive state, and as seen the light rays 92 have passed the lens without any refraction. The sketch to the right shows the same 93 for an adjustable Fresnel lens being in an "on" state, i.e. in a refractive state. Here it is seen that light rays 94 are refracted in different directions.

More alternatively, adjustable or switchable holographic type lenses can be used with the same or better properties. This possibly induces additional requirements on the collimated backlight, e.g. on spectral purity or coherence.

FIG. 8 illustrates first and second lenses 100, 102 positioned at different distances $d_1$, $d_2$ from a 2D image in a depth direction. The lenses 100 and 102 are normal negative lenses, for which the calculations to come are substantially simpler than for our horse-saddle shaped lenses. The results are however the same, as we already indicated that the embodiments according to FIGS. 1 and 2 are effectively the same. The two lenses 100 and 102 give rise to a single virtual, effective lens 101 with an apparent position $d_{\mathit{eff}}$ in between the first and second lenses 100, 102, A light ray 103 follows a path from the 2D image through the lenses 100, 102. Its apparent path through the virtual lens is 104. Focal lengths of the first lens, the virtual lens, and the second lens, will be denoted $f_1$, $f_{\mathit{eff}}$, and $f_2$, respectively, in the following. Corresponding optical strengths $C_1$, $C_{\mathit{eff}}$ and $C_2$, defined with respect to focal length as $C=1/f$, will be used in the following calculations.

For negative lenses C is defined as larger than 0. It is now defined that the strength of the first and second (i.e. the real) lenses are:

$$C_1 = \alpha_1 C_{max}, \quad C_2 = \alpha_2 C_{max} \tag{1}$$

Here, both $\alpha$'s are freely adjustable in between 0 and 1, and $C_{max}$ denotes a maximum strength for the lenses. Further, for the virtual lens strength, it can be found:

$$\begin{aligned} C_{\mathit{eff}} &= C_1 + C_2 + C_1 C_2 (d_2 - d_1) \\ &= (\alpha_1 + \alpha_2) C_{max} + \alpha_1 \alpha_2 (d_2 - d_1) C_{max}^2 \end{aligned} \tag{2}$$

The position of the virtual lens is given by:

$$\begin{aligned} d_{\mathit{eff}} &= d_2 - (d_2 - d_1)\frac{C_1}{C_{\mathit{eff}}} \\ &= d_2 - (d_2 - d_1)\frac{\alpha_1}{\alpha_1 + \alpha_2 + \alpha_1 \alpha_2 (d_2 - d_1) C_{max}} \end{aligned} \tag{3}$$

For the desired quantities:

$$C_{\mathit{eff}} = C_{max}$$

$$d_{\mathit{eff}} = \rho d_1 + (1-\rho) d_2 \tag{4}$$

it is found that:

$$\alpha_1 = \rho$$

$$\alpha_2 = (1-\rho)(1 + \rho C_{max}(d_2 - d_1))^{-1} \tag{5}$$

These are both within the interval 0 to 1, so these values are realizable. Further, the display viewing angle is related to lens aperture $W_{lens}$ (typically equal to the pixel size), divided by focal length ($1/C_{max}$), thus the display viewing angle $\beta$ can be written as:

$$\beta = 2\arctan\frac{1}{2}C_{max}W_{lens} \sim C_{max}W_{lens} \tag{6}$$

FIG. 9 illustrates a more precise calculation of $\beta$ via an embodiment with first and second arrays of adjustable lenses 110, 111, each having upper and lower parts relating to substrate with refraction index $n_{substrate}$ and a part with adjustable refraction index $n_{substrate} + \Delta n$, where $\Delta n$ is adjustable. The gap between the first and second arrays of lenses is air, i.e. with a refraction index $n_{air} \approx 1$. FIG. 9 shows a top view of the two layers, at a cross-section at the top of the lenses (top of the lens 60 in FIG. 4).

Only the simplest situation of $d_{\mathit{eff}} = d_1$ is considered, as the system performs the same for all $d_{\mathit{eff}}$. In this simple situation, the first array of lenses 110 is maximally turned "on" ($C_{max}$), and the second array of lenses is fully turned "off". This means that for the first lens 110, a refraction index for its lower part 112 is denoted $n_{substrate} + \Delta n$, a refraction index for an upper part 113 of the first lens 110 is given by $n_{ON} = n_{substrate}$. For the second lens 111, refraction indexes for its lower part 114 as well as its upper part 115 are $n_{substrate}$, since the second lens is turned "off".

Further, a light ray is shown, going in maximally left direction (our cross-section was chosen at the top of lens 60 as shown in FIG. 4, if e.g. the bottom of the lens was chosen as cross-section, the ray would have traveled to the maximum right direction).

The angle with which the angle leaves the second lens layer relates to half the viewing angle, i.e. $\beta/2$, as also illustrated in FIG. 9. Without going into further details, but assuming $n_{substrate}$ to be the same for the first and second lenses 110, 111 it can be derived that the display viewing angle $\beta$ can be written as:

$$\beta \sim 2\gamma \Delta n \tag{7}$$

Here $\gamma$ is an angle between the lower part 112 and the upper parts 113 of the first lens 110, as sketched in FIG. 9, relating directly to lens shape.

With e.g. current LC switchable lenses, $\Delta n \sim 0.3$, thus resulting in a viewing angle being approximately: $\beta \sim 0.6\gamma$.

FIG. 10 illustrates how undesired reflections as apparent in FIG. 6 can be minimized by additional control on backlight, and by reshaping of the lenses. Basically, the probability of a light ray hitting an edge of a lens is minimized. It is seen that a grid, barrier or grating 120 has been introduced in front of the first lens 121 with the purpose of spatially limiting incident light to only a central area of the lenses 121. In addition, each lens has been re-shaped to ensure that light rays pass only the correct part of each lens. The re-shaping is clearly seen by comparison with the shape of the lenses shown in FIG. 9. The thick rays shown in FIG. 10 indicate rays that may undergo reflections at the second lens layer in case of lenses with a shape as those shown in FIG. 9.

In alternative embodiments, arrays of adjustable lenses may be used where it is not possible to adjust optical properties of each lens individually, but rather uniformly—i.e. optical properties of all lenses of the array can be adjusted to all have the same property at a time. Thus, it is possible to provide an embodiment using two such uniformly arrays of uniformly adjustable lenses. For these embodiments, a full depth image can be shown using temporal multiplexing. First, the display matrix shows only background objects while the two arrays of lenses are adjusted to project this image at minimum depth. Then, the two arrays are adjusted continuously from back to front, while the display matrix shows objects appropriate for each depth. This requires a fast display matrix, e.g. a fast LCD type matrix, and some relatively simple image processing.

In the claims reference signs to the Figures are included for clarity reasons only. These references to exemplary embodiments in the Figures should not in any way be construed as limiting the scope of the claims.

The invention claimed is:

1. An optical system adapted to add an optical depth information to a two-dimensional image represented by substantially collimated light, the optical system comprising:
   a first array of optical lenses arranged at a first distance in front of the two-dimensional image, and
   a second array of optical lenses arranged at a second distance in front of the two-dimensional image, the second distance being larger than the first distance,
   wherein optical properties of the optical lenses of the first and second array of optical lenses are adjustable in response to the optical depth information.

2. Optical system according to claim 1, wherein the optical lenses of the first and second arrays of optical lenses can be switched between a first state and a second state, wherein the optical lenses are refractive in the first state and non-refractive in the second state.

3. Optical system according to claim 1, wherein a focal length of the optical lenses of the first and second arrays of optical lenses can be adjusted so as to emulate a virtual lens positioned between the first and second arrays of optical lenses.

4. Optical system according to claim 1, wherein the optical properties of the optical lenses are individually adjustable for each lens.

5. Optical system according to claim 1, wherein the optical properties of the optical lenses of the first array of optical lenses are continuously adjustable, and wherein the optical properties of the second array of optical lenses are continuously adjustable.

6. Optical system according to claim 1, wherein a shape of the adjustable optical lenses of the first and second arrays of lenses is selected from the group consisting of: horse-saddle shape, Fresnel-type shape, spherical shape, and lenticular shape.

7. Optical system according to claim 1, further comprising a processor adapted to perform a morphological filtering on the optical depth information prior to serving to adjust the optical lenses of the first and second arrays of optical lenses.

8. Optical system according to claim 1, wherein the two-dimensional image represented by collimated light includes a plurality of pixels.

9. Optical system according to claim 2, wherein a size of the optical lenses of the first and second arrays of optical lenses is substantially equal to or smaller than a pixel size of the two-dimensional image.

10. Optical system according to claim 1, further comprising a diffusor positioned at a third distance in front of the two-dimensional image, the third distance being larger than the second distance.

11. A method for applying an optical depth information to a two-dimensional image of pixels, the method comprising:
applying a first array of optical lenses arranged at a first distance in front of the two-dimensional image,
applying a second array of optical lenses arranged at a second distance in front of the two-dimensional image, the second distance being larger than the first distance, and
adjusting optical properties of the optical lenses of the first and second array of optical lenses in response to the optical depth information.

12. A three-dimensional display device adapted to receive a video signal including a depth information, the three-dimensional display device comprising:
a display arranged to display a two-dimensional image of substantially collimated light representing the video signal, and
an optical system comprising:
a first array of optical lenses arranged at a first distance in front of the two-dimensional image, and
a second array of optical lenses arranged at a second distance in front of the two-dimensional image, the second distance being larger than the first distance, wherein optical properties of the optical lenses of the first and second array of optical lenses are adjustable in response to the optical depth information.

* * * * *